United States Patent Office 3,274,152
Patented Sept. 20, 1966

3,274,152
POLYOLEFINS OF IMPROVED LIGHT STABILITY AND DYE RECEPTIVITY CONTAINING CHROMIUM SALTS OF HYDROXAMIC ACIDS
Albert S. Matlack, Wilmington, Del., assignor to Hercules Incorporated, Wilmington, Del., a corporation of Delaware
No Drawing. Filed Feb. 27, 1963, Ser. No. 261,499
5 Claims. (Cl. 260—45.75)

The present invention relates to polyolefin compositions and, more particularly, to polyethylene and stereoregular polymers of propylene and higher α-olefins having improved stability to light and an improved affinity for dyes.

Highly crystalline, high molecular weight polymers of ethylene, propylene, and higher α-olefins are well known and widely used. However, one of the deficiencies of such polymers which must be overcome to enable their use in many applications is poor stability against the deleterious effect of light. Additionally, since such polymers are extremely hydrophobic and resistant to penetration by aqueous solutions or suspensions and since such polymers do not contain functional groups in their structures which can serve as "dye sites" to enable dyestuffs to become firmly attached, it is quite difficult to color or dye such polymers with any of the dyes normally employed for coloring filaments or fabrics.

It is known that polyethylene and stereoregular polymers of propylene and higher α-olefins can be made receptive to metal-complexing dyes by incorporating in the polymer certain polyvalent metal oxides, hydroxides, or sulfates or carboxylic acid salts of certain polyvalent metals. Polymers so modified according to the prior art, however, are still subject to degradation by light and are unsuitable for many applications. It is also known that the polyolefins can be stabilized against degradation by light and simultaneously made receptive to metal-complexing dyes by the addition of certain nickel compounds, e.g., the nickel phenolates of bis(p-alkylphenol) sulfides, sulfoxides, and sulfones. Additionally, it is known that polyolefins can be stabilized against degradation by light by the addition of nickel salts of hydroxamic acids. The nickel hydroxamates have also been found to improve the receptivity of polyolefins to metal-complexing dyes. However, these nickel compounds often interfere with the obtention of bright and true colors in dyed yarns of the polymers.

In accordance with the present invention, it has been found that these polyolefins can be simultaneously stabilized to light and made more receptive to metal-complexing dyestuffs by incorporating in such polymers a small amount of a chromium salt of a hydroxamic acid, said salt having the formula

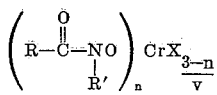

wherein R is a radical selected from the group consisting of hydrogen, hydrocarbon, oxyhydrocarbon, and substituted amino radicals, R' is a radical selected from the group consisting of hydrogen, hydrocarbon, oxyhydrocarbon, and substituted sulfonyl radicals, and not more than one of said radicals R and R' is hydrogen, X is an anion, $n$ is an integer from 1 to 3, and $v$ is the valence of said anion, and the use of these chromium compounds leads to brighter, truer colors in dyed yarns than in the case where the corresponding nickel compounds are used.

Any normally solid polymer of a mono-α-olefin having at least 2 carbon atoms can be treated in accordance with the invention. However, the invention is particularly useful in treating stereoregular polymers of monoolefins having from 3 to 6 carbon atoms, including, for instance, isotactic polypropylene, poly(butene-1), poly(pentene-1), poly(3-methylbutene-1), and poly(4-methylpentene-1). Polyethylene, even though it degrades under the influence of light by a mechanism somewhat different than the above stereoregular polymers, is also susceptible to treatment by the invention.

The chromium salts of hydroxamic acids used as additives in accordance with the invention increase the light stability of polyethylene, stereoregular polypropylene, and related stereoregular polymers quite markedly. An even further increase in light stability can be achieved, however, by also incorporating a phenolic compound in the polymer. In fact, such outstanding light stability is obtained that it makes these polymers useful for many applications requiring prolonged outdoor exposure. The use of a phenolic compound in addition to the chromium salt is a preferred embodiment of the invention.

The chromium salts that are used as both light stabilizers and dyeing aids in accordance with the invention can be made by methods known to the art. Suitable methods are reviewed by Brandt, Record of Chemical Progress, 21, 159 (1960).

In the previously assigned formula, the permissible R and R' substituents are numerous and varied. Preferably, the R and R' radicals together will contain from 5 to 30 carbon atoms. Typical hydrocarbon and oxyhydrocarbon radicals that the R and R' substituents can comprise are alkyl, aryl, cycloalkyl, aralkyl, alkaryl, alkoxy, and acyl radicals such as methyl, ethyl, propyl, n-butyl, decyl, pentadecyl, heptadecyl, octadecyl, phenyl, cyclohexyl, benzyl, tolyl, methoxy, ethoxy, butoxy, and similar radicals. Additionally, R can comprise substituted amino radicals such as alkylamino, arylamino, alkoxy alkylamino, and similar radicals and R' can comprise substituted sulfonyl radicals such as alkyl sulfonyl, aryl sulfonyl, alkoxy alkyl sulfonyl, and similar radicals. Suitable anions include chloride, bromide, hydroxide, oxide, phosphite, p-toluene sulfonate, methane sulfonate, aryl and alkyl phosphonates, molybdate, thiocyanate, cyanide, sulfate, nitrate, phosphate, benzoate, acetate, octanoate, e.g., 2-ethylhexanoate, octadecanoate, propionate, formate, 1,2,3,4-butane tetracarboxylate, polymethacrylate, and the like. Specific hydroxamic acids from which the chromium salts can be prepared include octanohydroxamic acid, decanohydroxamic acid, dodecanohydroxamic acid, tetradecanohydroxamic acid, dodecanohydroxamic acid, octadecanohydroxamic acid, and mixtures thereof.

The amount of chromium salt incorporated in the polymer can be varied from a very small amount up to several percent. More specifically, beneficial results are normally obtained when it is employed in an amount from 0.01% to about 5% by weight of the polymer.

As previously mentioned, one of the preferred, but optional, embodiments of the invention comprises incorporating into the polymer a phenolic compound in addition to the chromium salt. By this embodiment the ability of the chromium salt to stabilize the polymer is synergistically enhanced to an even greater degree. The phenolic compound, when used, preferably comprises from 0.01 to 5% by weight of the polymer. Suitable phenolic compounds that are useful in this embodiment include polyalkylphenols, alkylidene-bis(alkylphenol)s, 2(2'-hydroxyphenyl) - 2,4,4 - polyalkylchromans, 4(2' - hydroxyphenyl)-2,2,4-polyalkylchromans, and adducts of an alkylphenol and a cyclic terpene.

The phenolic compounds used to produce the compositions of the invention are well known. The polyalkylphenols that can be used are either di- or trialkylphenols. Particularly preferred are the 2,4,6-trialkylphenols described in U.S. 2,581,907 to Smith, Jr., et al. Inclusive of such compounds are:

2,4-dimethyl-6-t-butylphenol,
2,4-dimethyl-6-(alpha,alpha,gamma,gamma,tetra methylbutyl)phenol,
2,6-di-t-butyl-4-methylphenol,
2-methyl-4,6-di-t-butylphenol,
2,6-di-t-butyl-4-sec-butylphenol,
2,4,6-tri-t-butylphenol,
2,4,6-triethylphenol,
2,4,6-tri-n-propylphenol,
2,4,6-triisopropylphenol,
2,6-di-t-octyl-4-propylphenol,
2,6-di-t-butyl-4-ethylphenol,
2,4-dicyclohexyl-6-methylphenol,
2-isopropyl-4-methyl-6-t-butylphenol,
2,4-dimethyl-6-t-amylphenol,
2,4-di-t-amyl-6-methylphenol,
2,6-di-t-butyl-4-isopropylphenol,
2,6-di-t-amyl-4-methylphenol,
2,6-di-t-amyl-4-isopropylphenol,
2,4-diisopropyl-6-t-butylphenol, and
2,4-diisopropyl-6-sec-hexylphenol.

The preferred compounds of this class are those which have secondary or tertiary alkyl groups at the 2- and 6-position and a normal alkyl group at the 4-position, a representative of this class being 2,6-di-t-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms. Any of the dialkylphenols are suitable; particularly preferred is the 2,6-di-t-butylphenol.

The second class of phenolic compound, the alkylidene-bis(alkylphenol), is characterized by the general formula

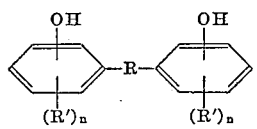

wherein R is an alkylidene radical of 1 to 5 carbon atoms and wherein R' is an alkyl group of 1 to 12 carbon atoms and $n$ is an integer from 1 to 3. When more than one R' substituent is present on a phenyl group, each R' can be the same or different.

Exemplary of these alkylidene-bis(alkylphenol)s that may be used are 2,2'-methylene-bis(5-isopropylphenol),
2,2'-methylene-bis(4-methyl-6-isopropylphenol),
2,2'-methylene-bis(4-methyl-6-t-butylphenol),
2,2'-methylene-bis(4-t-butyl-6-methylphenol),
2,2'-methylene-bis(4,6-di-t-butylphenol),
2,2'-methylene-bis(4-nonylphenol),
2,2'-methylene-bis(4-decylphenol),
4,4'-methylene-bis(2,6-di-t-butylphenol),
2,2'-isopropylidene-bis(5-methylphenol),
4,4'-methylene-bis(2-methyl-6-t-butylphenol).
2,2'-ethylidene-bis(4-methyl-6-t-butylphenol),
2,2'-ethylidene-bis(4,6-di-t-butylphenol),
2,2'-ethylidene-bis(4-octylphenol),
2,2'-ethylidene-bis(4-nonylphenol),
2,2'-isopropylidene-bis(4-methyl-6-isopropylphenol),
2,2'-isopropylidene-bis(4-isopropylphenol),
2,2'-isopropylidene-bis(4-isopropyl-6-methylphenol),
2,2'-isopropylidene-bis(4-methyl-6-t-butylphenol),
2,2'-isopropylidene-bis(4-octylphenol),
2,2'-isopropylidene-bis(4-nonylphenol),
2,2'-isopropylidene-bis(4-decylphenol),
2,2'-isobutylidene-bis(4-methyl-6-t-butylphenol),
2,2'-isobutylidene-bis(4-nonylphenol),
4,4'-butylidene-bis(3-methyl-6-t-butylphenol), etc.

The 2(or 4)-(2'-hydroxyphenyl)chromans that may be used are those which have one of the following general formulas:

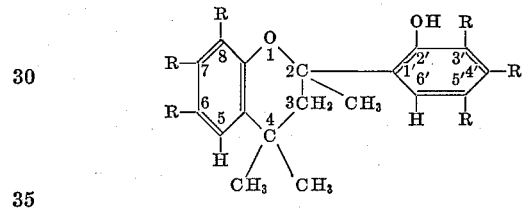

or

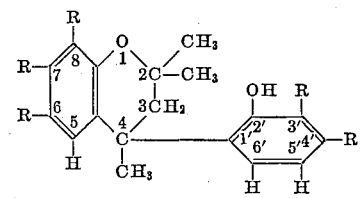

where each R may be hydrogen or alkyl, but at least one R in each of the aromatic rings is alkyl. These compounds may also be named as benzopyrans. Thus, the 2(2'-hydroxyphenyl)chromans may be named as 2,3-dihydro-2(2'-hydroxyphenyl)-1,4-benzopyrans or 3,4-dihydro - 2(2' - hydroxyphenyl)-1,2-benzopyrans and the 4(2'-hydroxyphenyl)chromans may be named as 2,3-dihydro - 4(2'-hydroxyphenyl)-1,4-benzopyrans or 3,4-dihydro-4(2'-hydroxyphenyl)-1,2-benzopyrans. The 2(2'-hydroxyphenyl)chromans are also sometimes named as flavans, i.e., 2'-hydroxyflavans. The alkyl substituents in each of the aromatic rings may be an alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2 (or 4)-(2'-hydroxyphenyl)chromans that may be used in combination with the chromium complexes are 2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5',6-diisopropyl-2,4,4,3'-8-pentamethylchroman,
2(2'-hydroxyphenyl)-5',6-di-t-butyl-2,4,4-trimethylchroman,
4(2'-hydroxyphenyl)-5',6-di-t-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)-5',6-didecyl-2,4,4-trimethylchroman, etc.

The alkylidene-bis(alkylphenol)s are prepared by any of the well-known procedures of the prior art. Usually, they are prepared by reacting an alkylphenol with formaldehyde, acetaldehyde, acetone, or methyl ethyl ketone, etc., in the presence of a strong acid such as hydrochloric acid, etc. In a similar fashion, the 2(2'-hydroxyphenyl)chromans are prepared by reacting an alkylphenol with acetone and the 4(2'-hydroxyphenyl)chromans are prepared by reacting an alkylphenol with mesityl oxide. Thus, in many of these reactions a mixture of alkylidene-bis(alkylphenol)s and (2'-hydroxyphenyl)chromans is obtained, as, for example, when acetone is condensed or reacted with an alkylphenol the reaction may be a 2(2'-hydroxyphenyl)chroman or an isopropylidene-bis(alkylphenol), depending on the reaction conditions, or the reaction product may be a mixture of these two types of compounds. In such cases, the individual compounds need not be isolated but instead the reaction product may be used with excellent results.

The terpene-phenol adducts that are used in accordance with the invention are known materials that have been described frequently in the prior art.

Generically defined, they are adducts of phenol or an alkylphenol that contains from 1 to 2 alkyl substituents of 1 to 10 carbon atoms each and a cyclic unsaturated terpene or dihydroterpene of empirical formula $C_{10}H_{16}$ or $C_{10}H_{18}$, respectively. They can be prepared by condensing phenol, or an alkylphenol, with the terpene, or dihydroterpene, in varying ratios in the presence of an acidic catalyst.

Suitable cyclic terpenes and dihydroterpenes from which the aforesaid adducts can be made include carvomenthene, dipentene, α-pinene, α-terpinene, terpinolene, 2-menthene, 3-menthene, dihydroterpinolene, dihydrodipentene, camphene, Δ3-carene, β-pinene, and the like. Suitable phenols, in addition to phenol itself, include the various isomeric cresols, 2,4-xylenol and other isomeric xylenols, p-sec-butylphenol, p-isopropylphenol, o-isopropylphenol, m-isopropylphenol, o,o'-diisopropylphenol, o,o'-di-t-butylphenol, o-amylphenol, o-nonylphenol, and similar compounds.

The two reactants can be condensed in varying ratio. Any ratio within the range of 0.3 to 3 moles of terpene or dihydroterpene per mole of the phenolic compound is satisfactory, but it is preferred to employ a ratio within the narrower range of 0.5 to 2.5 moles of terpene or dyhydroterpene per mole of the phenolic compound.

The adduct formation is carried out by contacting the two reactants in the presence of an acid catalyst at a temperature within the range of about 0 to 150° C. and allowing the reaction to proceed. An inert solvent may be used as a reaction medium for convenience if so desired. Normally the reaction will go to substantial completion in from 1½ to 5½ hours. Upon termination of the reaction, unconsumed reactants and volatile by-products can be removed by distillation at reduced pressure since the adducts themselves are high boiling materials.

The acid catalyst can be any of those acids or acidic compounds that are useful catalysts in condensation reactions generally. These include mineral acids such as sulfuric acid, organic acids, such as p-toluene sulfonic acid, boron trifluoride and its derivatives, as, for instance, complexes of boron trifluoride and an ether, e.g., boron trifluoride-ethyl ether complex, metal chlorides such as aluminum chloride and stannic chloride, and acidic clays.

The terpene-phenol adducts are in all cases not a simple chemical compound but rather a mixture of compounds, principally phenolic ethers and terpenylated phenol. Thus, for instance, the adduct of 2 moles of camphene and 1 mole of p-cresol is a mixture of compounds in which mixture the principal ingredient is diisobornyl-p-cresol (the isobornyl radical being formed by isomerization of camphene) but which also contains lesser amounts of the isobornyl ether of p-cresol.

In the case of other terpenes, or dihydroterpenes, and other phenols, similar adducts are formed in which the proportion of ingredients will vary depending on the ratio of reactants and the catalyst employed. Consequently, the adducts employed in the invention are incapable of structural definition.

The additives used in accordance with this invention may be admixed with the polyolefin by any of the usual procedures for incorporating an additive into a solid material. A simple method is to dissolve the additives in a low boiling solvent such as benzene or hexane and, after thoroughly mixing the solution with the polymer in flake or other such form, evaporating the solvent; or they may be incorporated by various mechanical means such as mixing, etc.

In addition to the phenolic compound and the chromium salt, there may also be present phosphites, antistatic agents, and the like. The chromium salt may also be used in combination with other stabilizers such as other ultraviolet light absorbers, antacids such as calcium soaps, or other antioxidants. Other materials may also be incorporated in the polymer, as, for example, pigments, fillers, etc.

The following examples will illustrate the degree of stabilization and dyeability that is obtained when a polyolefin is treated in accordance with this invention. The term "RSV" as used herein denotes reduced specific viscosity, which is the specific viscosity divided by concentration of a 0.1% weight/volume solution of polymer in decahydronaphthalene at 135° C. All parts and percentages are by weight unless otherwise stated, and the percentage of stabilizer is based on the weight of polymer.

*Example 1*

Stereoregular polypropylene having a birefringent melting point of about 168° C. and a reduced specific viscosity of 4.0 was thoroughly blended with 0.5% of a mixture of chromium octadecanohydroxamate and chromium hexadecanohydroxamate, 0.5% of the reaction product of 2 moles of nonylphenol and 1 mole of acetone, the reaction product (hereinafter referred to as NP—A—RP) comprising a mixture of isopropylidene-bis(nonylphenol) and 2(2' - hydroxyphenyl) - 2,4,4-trimethyl-5,6-dinonylchroman, and 0.4% of calcium stearate (an antacid employed as an extrusion aid). The mixture of chromium octadecanohydroxamate and chromium hexadecanohydroxamate was prepared by mixing a solution of 5.70 parts of a mixture of hexadecanohydroxamic acid and octadecanohydroxamic acid in 45 parts boiling anhydrous methanol with a solution of 1.65 parts chromium (III) acetate in 45 parts boiling anhydrous methanol, quickly cooling the mixture to room temperature, adding slowly with stirring a solution of 1.3 parts potassium hydroxide in anhydrous methanol, allowing the mixture to stand for several days at 0° C., and then filtering off the green solid product. The product, after recrystallization with ether acetonitrile, contained 6.62% chromium [theory for $$(C_{16}H_{33}CONHO)_3Cr = 5.8\%$$

chromium]. The blend was extruded into molding powder at 210° C., and the molding product was then pressed into sheets 25 mils thick. Strips cut from these sheets and 0.5 inch wide were fastened onto pieces of white cardboard and exposed to outdoor weathering in southern Florida at a 45° angle facing south. During the outdoor exposure the development of brittleness in each strip was observed by periodically folding to an angle of 180° and noting any change taking place on the fold line. The following rating schedule was used to evaluate the degree of brittleness:

1=unchanged from original condition
2=slight surface crazing on fold
3=shallow cracks on fold
4=breaks in cheesy manner, but pieces hang together, considered failure
5=brittle break, failure The outdoor exposure rating for the composition is shown in the table below.

TABLE 1

|  | Rating After Florida Exposure ||
|---|---|---|
|  | Rating | Langleys |
| Control (contains NP-A-RP but no chromium salt) | 5 | 20,000 |
| Example 1 | 3-4 | 30,000 |

*Example 2*

Example 1 was repeated except that the composition did not contain the reaction product of nonylphenol and acetone. In this example the embrittlement time was determined in a fadeometer by periodically examining the strip and noting the time elapsed until it became brittle, the embrittlement point being the time (in days) elapsed until a strip breaks when bent double. The composition containing the mixture of chromium octadecanohydroxamate and chromium hexadecanohydroxamate failed after 7 days, whereas the control containing no chromium salt failed in one day.

*Example 3*

Polyethylene having a density of 0.96 was stabilized with 0.5% of a mixture of chromium octadecanohydroxamate and chromium hexadecanohydroxamate in the manner of Example 2, the embrittlement time being determined in a fadeometer. The control sample containing no stabilizer failed in 7 days whereas the stabilized composition failed after 19 days.

*Examples 4–7*

In these examples yarns (6 denier per filament) were melt spun from a stereoregular polypropylene blend prepared as in Example 1, except that 0.75% of the chromium salt mixture was used instead of 0.5%, and fabric in the form of tubing was knit from 210 denier, 35 filament yarn having the following physical properties:

Tenacity _____ grams per denier __ 6.25
Elongation at break _____ percent __ 35.8
Free shrinkage in boiling water _____ do ____ 2.5

Fabric was also prepared in the same way from similar blends containing 0.75% of a mixture of the corresponding nickel hydroxamates in place of the chromium salts. The fabrics were scoured for 30 minutes at 70° C. at a 40 to 1 liquor/fiber ratio by weight in an aqueous solution containing 1% sodium dodecyl benzene sulfonate, an anionic detergent, and 0.25% sodium carbonate, based on the weight of the fiber. The scoured, wet fabric specimens were introduced into a dye bath at room temperature, whereupon the dye bath was heated to boiling in 30 minutes with continuous stomper agitation, and boiling and agitation were continued for 2 hours. The dyed fabrics were rinsed in water, and then scoured in a scouring bath containing 2% sodium carbonate and 5% sodium dodecyl benzene sulfonate, based on the weight of the fiber, in the ratio of 40 to 1, scouring bath to fiber, by weight for 30 minutes at 70° C. The dyed fabrics were then rinsed and air dried at room temperature.

The dye baths for these examples were prepared as follows:

Ratio of dye liquor to fiber (by weight) _____ 40/1
Emulsifier (Sulframin AB) percent (O.W.F.) __ 1
Acetic acid _____ do ____ 0.2
Dye _____ do ____ 0.25 to 0.5

O.W.F.=based on weight of fiber

The dye in each case was added to the dye bath in the form of a concentrated aqueous dispersion of dye particles.

Table 2 following lists pertinent data with respect to the structural formula of the dye used in each example, general color, and a notation of the color of the dyed fabric according to the Munsell system of color which measures the three attributes of color known in the system as hue, value, and chroma, as compared with Munsell color standards and color stability of the fabric after subjection to fadeometer exposure. In the Munsell system, the hue notation of a color indicates its relation to red, yellow, green, blue, and purple, the value notation indicates its lightness; and the chroma notation indicates its strength (or departure from Neutral). In recording a color by Munsell notation, the symbol for hue is written first and is followed by a symbol written in fraction form, the numerator indicating the value and the denominator indicating the chroma (H V/C). The measure of a given color sample, then, is the Munsell notation of its position in relation to the standards in the Munsell Book of Color, Munsell Color Company, Inc., Baltimore, Maryland (1929–1960). Evaluation of color stability after fadeometer exposure was made by noting the change in shade using the International Grey Scale rating where 5=no change
4=noticeable change
3=moderate change
2=severe change
1=very severe change
(0)=completely stripped of color.

In the table, the letter "A" following the example number denotes fabrics prepared from blends containing the chromium salt, and "B" denotes fabrics from blends containing the corresponding nickel salt.

TABLE 2

| Example No. | Structural Formula of Dye Molecule | General Color of Dyed Fabric | Munsell Value (H V/C) | Color Stability on Fadeometer Exposure for — | |
|---|---|---|---|---|---|
| | | | | 20 Hours | 40 Hours |
| 4A | (structure: COOH, HO, N=N—C, CH₃, with Cl on phenyl, pyrazolone) | Yellow | 5Y 8/10 | 2 | |
| 4B | | Yellow | 5Y 8/10 | 5 | 5 |
| 5A | (structure: C₆H₅, OH, —N=N—, naphthalene) | Orange Brown | 10R 5/8 | 4 | 3 |
| 5B | | Orange Brown | 7.5R 7/8 | 4 | 3 |
| 6A | (structure: NO₂, OH, —N=N—C, Cl, CH₃, pyrazolone with phenyl) | Red | 10RP 5/10 | 1 | |
| 6B | | Red Brown | 2.5R 4/6 | 4 | 3 |
| 7A | (structure: O₂N—, OH, —N=N—, OH, Cl, naphthalene) | Violet Blue | 7.5PB 4/6 | 5 | 3 |
| 7B | | Brown Violet | 10P 6/4 | 2 | |

As can be seen from the above comparison of Munsell color notations, the use of the chromium hydroxamates gave truer, brighter colors in dyed yarns than in the cases where the corresponding nickel compounds were used.

The dyes that can be employed in dyeing any of the polymers described herein are those selected dyes of low water solubility having the ability to penetrate or diffuse into the polymer from a dispersion of dye particles in an acidified aqueous dye bath and the ability to be insolubilized within the polymer by forming stable complexes with the chromium salts of this invention. In view of these characteristics, the selected dyes of this invention are termed "disperse-mordant" dyes to distinguish them from conventional mordant dyes which are water soluble and which are incapable of diffusing into stereoregular polyolefins. Suitable dyes include the anthraquinone and monoazo dyes characterized by the presence therein of substituent groups which form insoluble stable complexes with polyvalent metal mordanting agents, by the absence of substituent groups which impart substantial water solubility to said dye, such as sulfonic acid substituent groups, and by small compact molecular size.

Some typical dye structures meeting these requirements are exemplified by the following structural formulas. However, the invention is not limited to these.

(1) 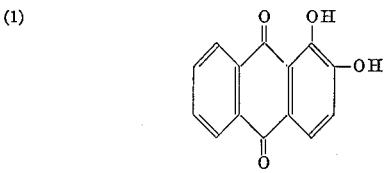

(2) 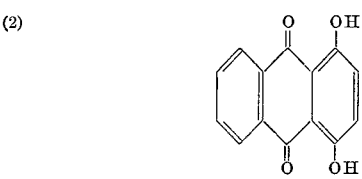

(3) 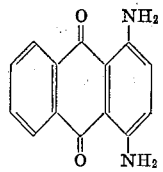

(4) 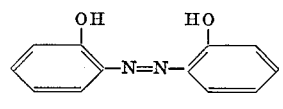

(5) 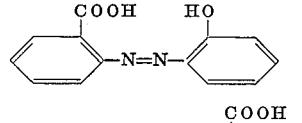

(6) 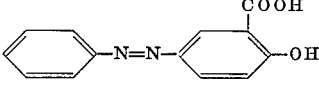

(7) 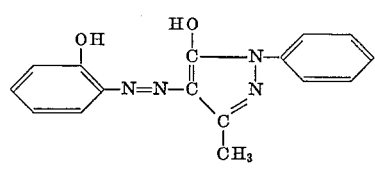

(8) 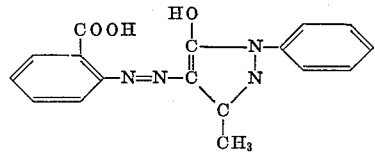

In structural Formulas 4 to 8, inclusive, naphthalene rings may be substituted for the benzene rings shown.

It will be seen that suitable anthraquinone dyes have hydroxyl groups in either the 1,2- or 1,4-positions, as depicted by Formulas 1 and 2 above, or $NH_2$ groups in the 1,4-positions, as in Formula 3 above. It will be seen that azo dyes in accordance with this invention have a hydroxyl group on a carbon atom adjacent to a carbon atom attached to an azo group, as in Formulas 4, 5, 7, and 8, or a hydroxyl group on a carbon atom adjacent to a carbon atom attached to a carboxyl group, as in Formula 6. Suitable dyes may also have, permissibly, but not necessarily, one or more of the following substituent groups attached to the dye molecule: alkyl, hydroxyalkyl, alkoxyl, hydroxyl, nitro, halo, acetamido, or sulfonamido groups.

The amount of dye employed can be varied as desired from as little as 0.1%, or less, based on fiber weight, to as much as 5% or more, depending largely on the depth of color desired, it being apparent that depth of color increases with increasing amount of dye employed.

The stereoregular polymers of this invention in the form of film, fiber, filament, thread, yarn, cord, or fabric woven from such fibers, having the chromium salt uniformly dispersed therein, are given a preliminary conventional scouring treatment in an aqueous detergent or soap bath to remove residual spinning, molding, and weaving lubricants and sizing agents prior to dyeing. The thus prepared film or fiber is then immersed wet in the dye bath, usually at room temperature, and containing a dispersion of dye particles of the selected dye and a conventional wetting agent. The dye bath is then brought to the boiling point and held at the boiling point, preferably with agitation, until the desired dye shade has been attained, after which the dyed fibers or film are rinsed, given a post-dyeing conventional scouring treatment in an aqueous detergent or soap bath to remove any dye particles adhering loosely to the surfaces, and then dried. It is apparent, therefore, that the mechanics of the dyeing operation, per se, apart from selection of dyestuff, follow more or less conventional dyeing practice.

From the foregoing, it is apparent that stereoregular polymers of α-olefins having 3 or more carbons may be modified in accordance with this invention to impart light stability and dye affinity to the polymers as well as to any fiber, film, or other shaped object made from these polymers.

What I claim and desire to protect by Letters Patent is:

1. A polyolefin selected from the group consisting of polyethylene and a stereoregular polymer of a mono-α-olefin having from 3 to 6 carbon atoms containing a small amount of a chromium salt of a hydroxamic acid, said salt having the formula

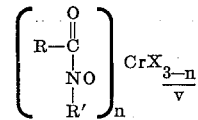

wherein R is a radical selected from the group consisting of hydrogen, hydrocarbon, oxyhydrocarbon and substituted amino radicals, R' is a radical selected from the group consisting of hydrogen, hydrocarbon, oxyhydrocarbon and substituted sulfonyl radicals, and not more than one of said radicals R and R' is hydrogen, X is an anion, $n$ is an integer from 1 to 3, and $v$ is the valence of said anion.

2. The composition of claim 1 in which the chromium salt is that of a mixture of octadecanohydroxamic acid and hexadecanohydroxamic acid.

3. The composition of claim 1 containing also a small amount of a phenolic compound selected from the group consisting of polyalkylphenols, alkylidene - bis(alkylphenol)s, 2(2'-hydroxyphenyl)-2,4,4-polyalkylchromans, 4(2'-hydroxyphenyl)-2,2,4-polyalkylchromans, and adducts of an alkylphenol and a cyclic terpene.

4. The composition of claim 1 in which the polyolefin is stereoregular polypropylene.

5. The composition of claim 1 in which the polyolefin is polyethylene.

No references cited.

LEON J. BERCOVITZ, *Primary Examiner.*

DONALD E. CZAJA, *Examiner.*

M. J. WELSH, *Assistant Examiner.*